United States Patent
Krüger et al.

(10) Patent No.: US 12,221,376 B2
(45) Date of Patent: Feb. 11, 2025

(54) METHOD FOR PRODUCING A GLASS-PLASTIC CONNECTION

(71) Applicant: LPKF LASER & ELECTRONICS AG, Garbsen (DE)

(72) Inventors: Robin Krüger, Hannover (DE); Oktavia Ostermann, Hannover (DE); Bernd Rösener, Porta Westfalica (DE); Malte Schulz-Ruhtenberg, Wunstorf (DE); Roman Ostholt, Langenhagen (DE); Tobias Jaus, Nuremberg (DE); Anna Kolossowski, Fürth (DE)

(73) Assignee: LPKF LASER & ELECTRONICS AG, Garbsen (DE)

( * ) Notice: Subject to any disclaimer, the term of this patent is extended or adjusted under 35 U.S.C. 154(b) by 674 days.

(21) Appl. No.: 17/426,243

(22) PCT Filed: Jan. 29, 2020

(86) PCT No.: PCT/EP2020/052198
§ 371 (c)(1),
(2) Date: Jul. 28, 2021

(87) PCT Pub. No.: WO2020/157155
PCT Pub. Date: Aug. 6, 2020

(65) Prior Publication Data
US 2022/0089478 A1    Mar. 24, 2022

(30) Foreign Application Priority Data
Feb. 1, 2019  (DE) .......................... 102019201350.3

(51) Int. Cl.
*C03C 17/32*    (2006.01)
*C03C 15/00*    (2006.01)
(Continued)

(52) U.S. Cl.
CPC .............. *C03C 17/32* (2013.01); *C03C 15/00* (2013.01); *C03C 23/0025* (2013.01);
(Continued)

(58) Field of Classification Search
None
See application file for complete search history.

(56) References Cited

U.S. PATENT DOCUMENTS

| 7,943,090 B2 | 5/2011 | Augstein |
| 9,097,679 B2 | 8/2015 | List et al. |

(Continued)

FOREIGN PATENT DOCUMENTS

| CN | 201288133 Y | 8/2009 |
| DE | 10155312 A1 | 5/2003 |

(Continued)

OTHER PUBLICATIONS

JP-11304740-A EPO Machine Translation performed May 29, 2024. (Year: 2024).*

(Continued)

*Primary Examiner* — Lisa L Herring
(74) *Attorney, Agent, or Firm* — Greer, Burns & Crain, Ltd.; Steven P. Fallon

(57) ABSTRACT

A process for the production of a glass-plastic connection which is form-fitting, and to a form-fitting composite between glass and plastic which is obtainable by the process. The process and the glass-plastic composite are characterized in that a glass, which in particular is planar, neither during the process nor in the glass-plastic composite is subjected to a mechanical load which could lead to cracks, e.g. microcracks. Accordingly, in the composite, the glass is connected to a plastic in a stress-free manner The composite of glass with plastic is especially gas-proof and/or liquid-proof.

16 Claims, 13 Drawing Sheets

Figure 1:
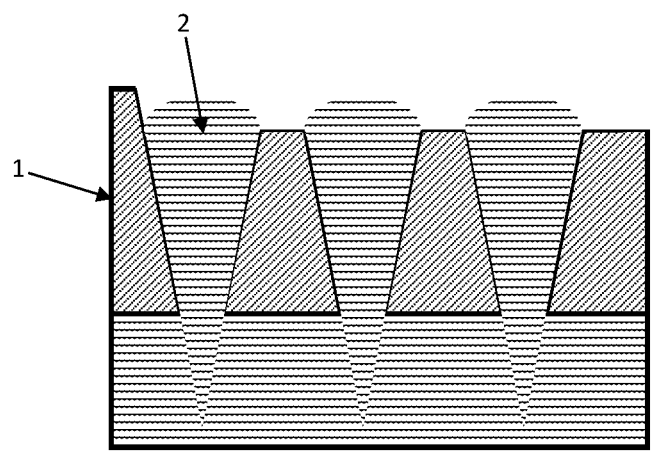

(51) Int. Cl.
　　　C03C 23/00　　　(2006.01)
　　　C03C 27/06　　　(2006.01)
(52) U.S. Cl.
　　　CPC .......... *C03C 27/06* (2013.01); *C03C 2218/31* (2013.01); *C03C 2218/365* (2013.01)

(56) References Cited

U.S. PATENT DOCUMENTS

| 9,236,274 | B1 | 1/2016 | Mobley et al. |
| 2016/0221254 | A1 | 8/2016 | Saito et al. |

FOREIGN PATENT DOCUMENTS

| JP | 11304740 | A | * | 11/1999 | | |
| JP | 2003246638 | A | * | 9/2003 | ........... | B23K 26/073 |
| JP | 2018200944 | A | | 12/2018 | | |
| TW | 201720974 | A | * | 6/2017 | ........... | B23K 26/382 |

OTHER PUBLICATIONS

JP-2003246638-A Clarivate Analytics Machine Translation retrieved May 29, 2024. (Year: 2024).*
TW-201720974-A Clarivate Analytics Machine Translation retrieved May 29, 2024. (Year: 2024).*
International Search Report from the corresponding International Patent Application No. PCT/EP2020/052198, dated Apr. 3, 2020.

* cited by examiner

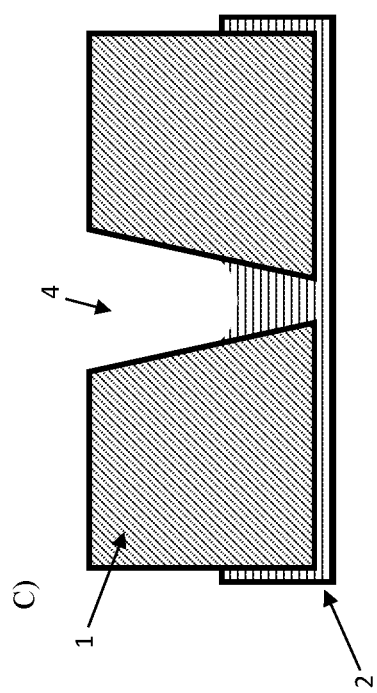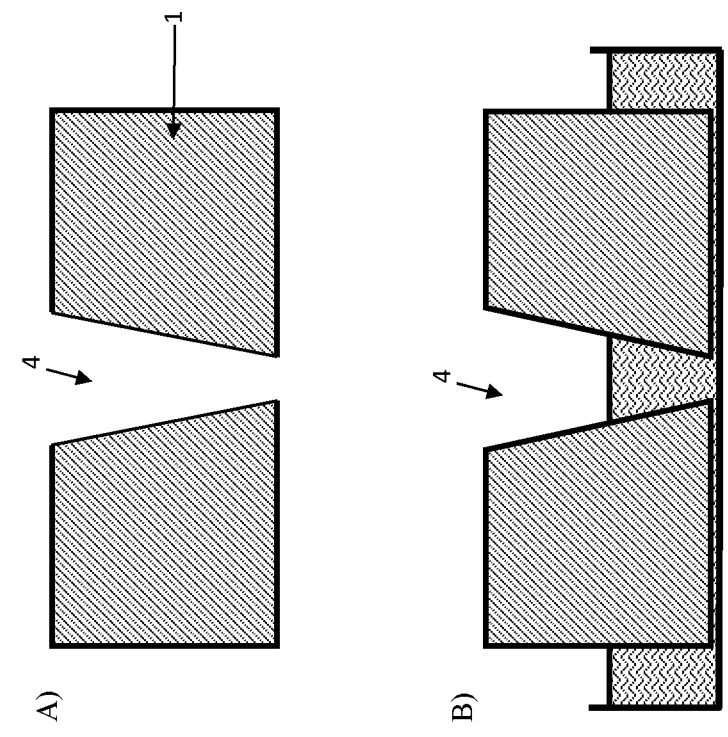
Fig. 4

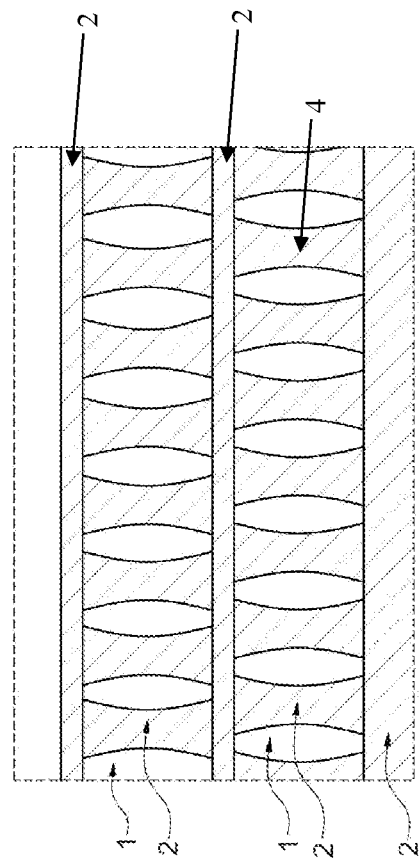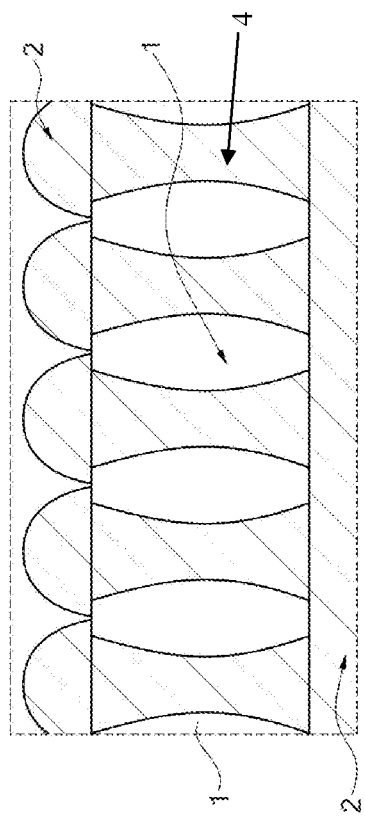
Fig. 7 B
Fig. 7 A

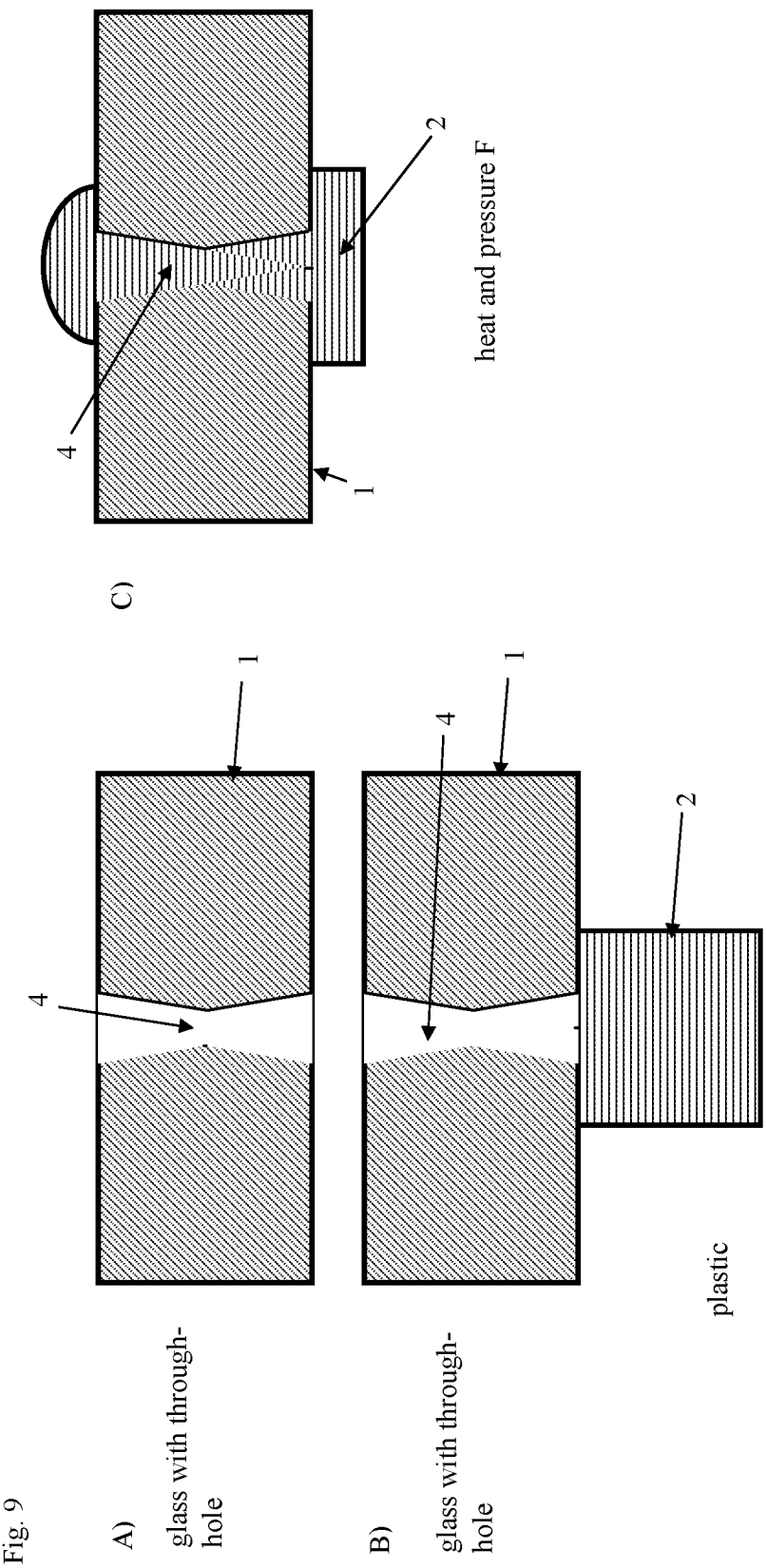

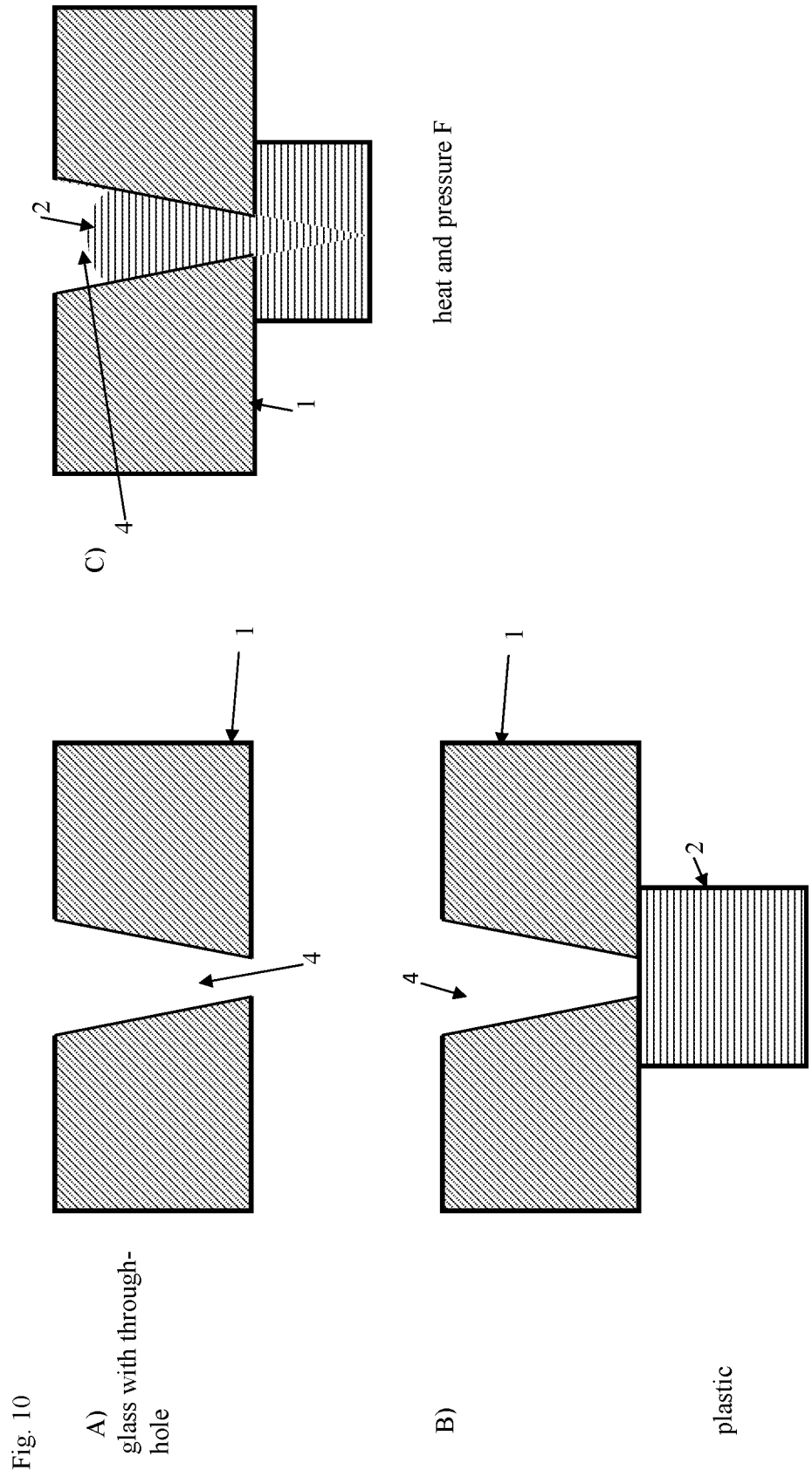

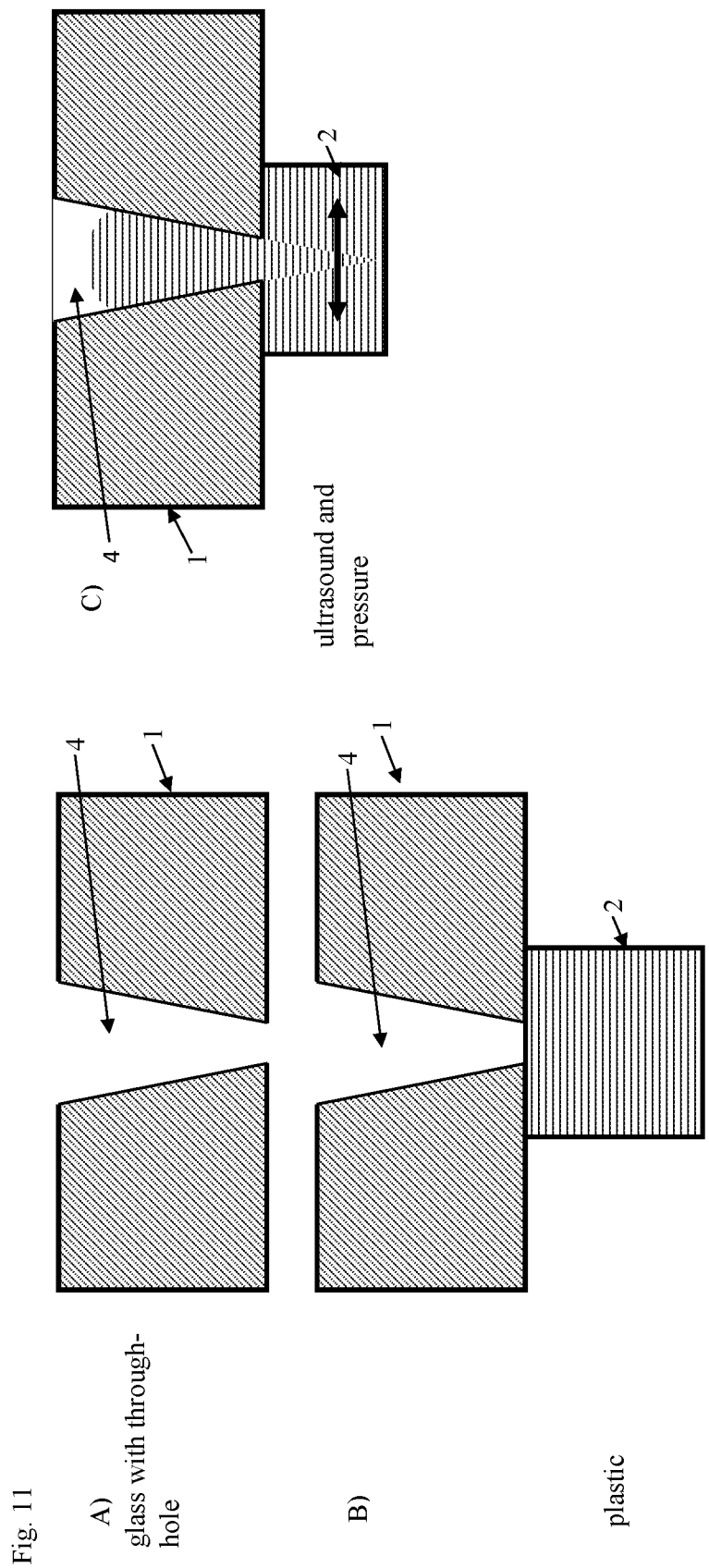

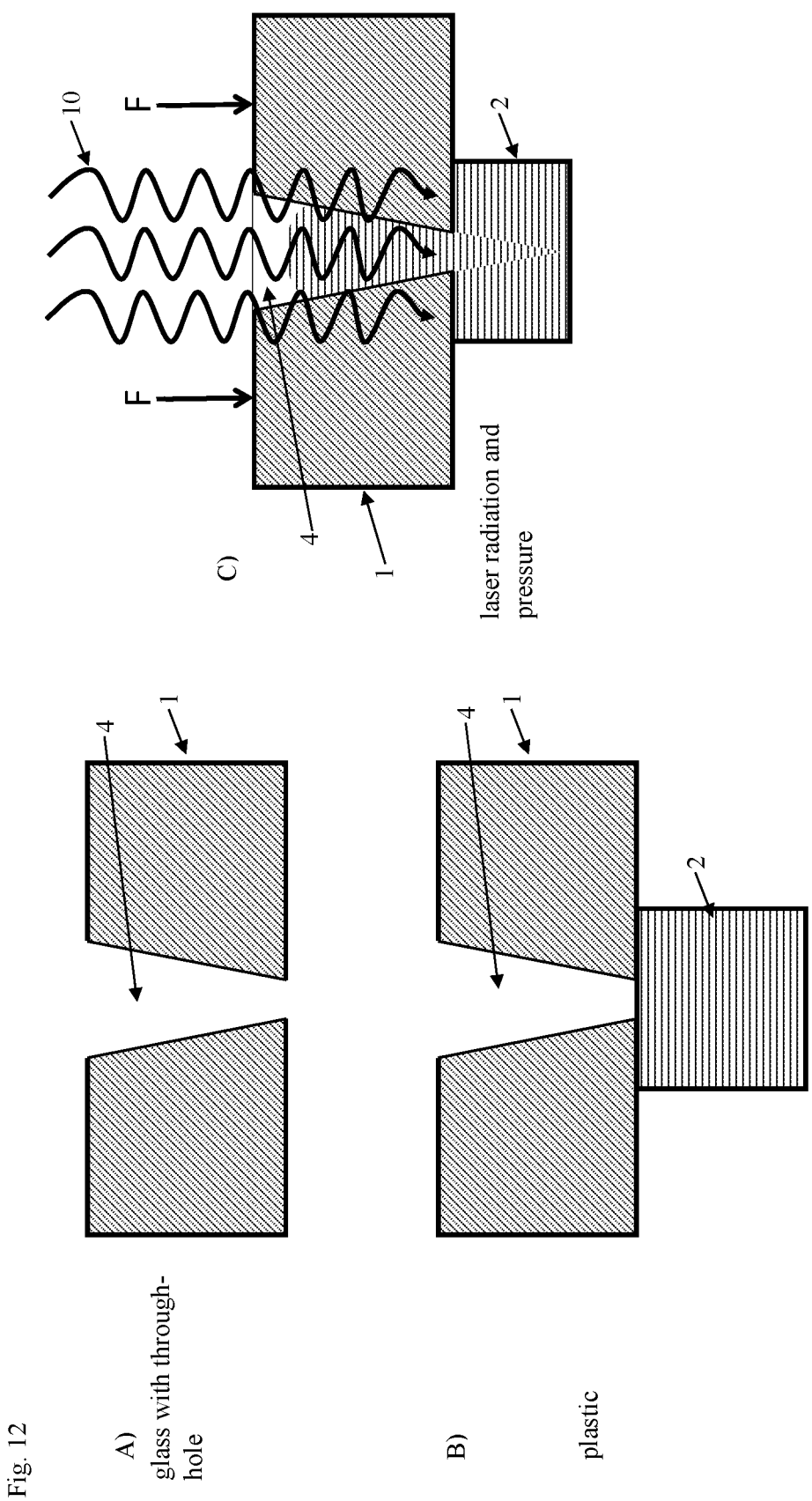

Fig. 15
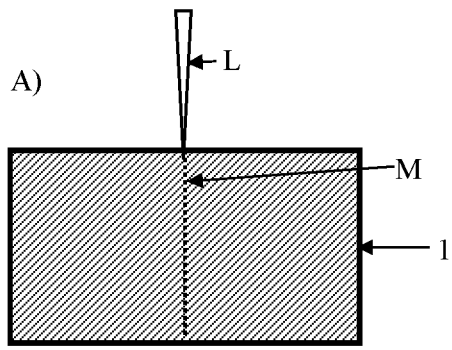
A)
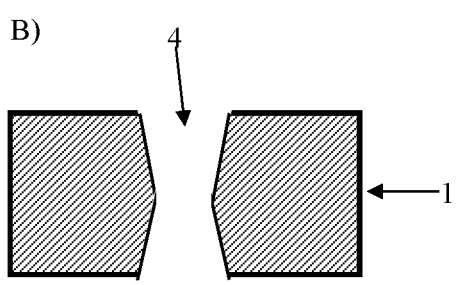
B)
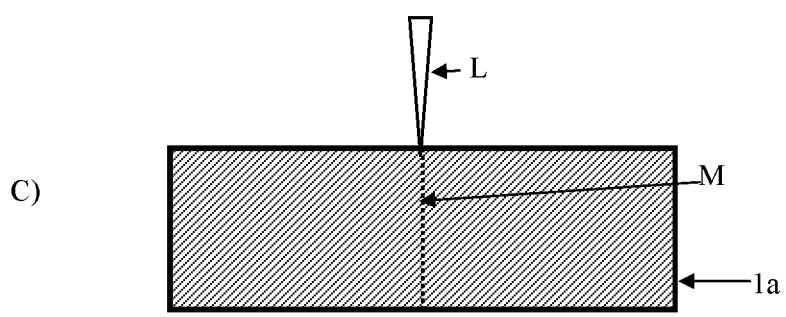
C)
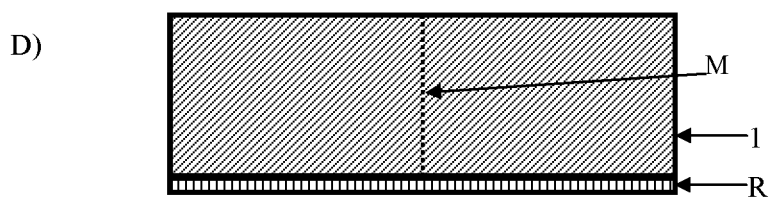
D)
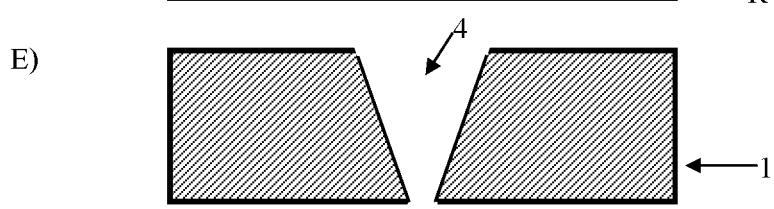
E)

METHOD FOR PRODUCING A GLASS-PLASTIC CONNECTION

The present invention relates to a process for the production of a glass-plastic connection which is form-fitting, and to a form-fitting composite between glass and plastic which especially is obtainable by the process.

The process and the glass-plastic composite obtainable by the process are characterized in that a glass, which in particular is planar, neither during the process nor in the glass-plastic composite is subjected to a mechanical load which could lead to cracks, e.g. microcracks. Accordingly, in the composite, the glass is connected to a plastic in a stress-free manner. The composite of glass with plastic is fluid-proof, especially gas-proof and/or liquid-proof, e.g. proof against aqueous compositions.

The process and the glass-plastic composite are also characterized in that optionally no additional material is introduced into the composite, e.g. no adhesive and no sealant is contained in the glass-plastic composite.

Embodiments of the glass-plastic composite include plane connections between a plastic layer and glass, as well as glass that covers an opening in a plastic, e.g. a recess or breach in a plastic, especially glass which covers the cross-section, e.g. terminally, of a conduit made of plastic and which is connected to the plastic. The glass-plastic composite can extend between glass and plastic over the entire area or sectionally, e.g. straight or curved, linearly traversing or sectionally or resp. interrupted, optionally circumferentially closed or only sectionally along a circumference, e.g. of a recess in the plastic.

Outside of the area of the glass-plastic composite, the glass and/or the plastic can have recesses and breaches which allow fluids, especially liquids or gases, to pass through.

STATE OF THE ART

DE 101 55 312 A1 describes the filling of superimposed recesses with curable plastic for joining two workpieces arranged in parallel, wherein a recess can extend from only one surface of the one workpiece into it in a U-shape or as a blind hole with undercut, or the plastic has a head on a surface facing away from the other workpiece. Glass is not mentioned as a material of a workpiece.

US 2016/0221254 A1 describes the joining of metal surfaces to glass surfaces by plastic between these surfaces, which plastic supposedly penetrates into pores of the surfaces.

EP 2 977 004 B1 describes for the joining of parts of a housing to the housing by manufacturing the housing by injection moulding and thereby overmoulding the parts.

EP 1 543 935 A2 describes the edging of glass by overmoulding the glass with plastic within an injection mould.

OBJECT OF THE INVENTION

The object of the invention is to provide an alternative process for the production of a connection between glass and plastic, and to provide a glass-plastic composite which is preferably fluid-proof, which is further preferably fluid-proof when the glass and plastic have a different expansion behaviour upon changes in temperature. Preferably, the glass-plastic composite should be without additional material, e.g. without adhesive or sealant. Preferably, the glass-plastic composite should be form-fitting and should consist solely of glass and plastic.

DESCRIPTION OF THE INVENTION

The invention achieves the object by the features of the claims and in particular provides a process comprising or consisting of the steps of
1. providing a glass substrate having spaced recesses traversing through the glass substrate and having at least one undercut, wherein the undercut is formed within the glass substrate,
2. applying at least one solidifying plastic onto the glass substrate in the area of the recesses and introducing the plastic into the recesses,
3. solidifying the plastic.

The undercut is formed by the recess which is formed as traversing through the glass substrate and which widens within the glass substrate. Additionally, the recess can taper within the glass substrate such that the recess tapers and adjacently widens and forms an undercut within the glass substrate.

The recesses traversing through the glass substrate extend from one surface through the glass substrate to the opposite surface. Generally preferably, the recesses each have a longitudinal axis that runs in perpendicular or at an angle varying from 90° to one or resp. to both of the opposite surfaces of the glass substrate, wherein the surfaces of the glass substrate are in parallel to one another.

The glass substrate having recesses is preferably provided by treating a glass substrate with laser pulses at the positions where recesses are to be generated, and subsequently etching the glass substrate. This is because laser pulses generate modifications, e.g. structural changes, in the glass substrate, which are dissolved more quickly during the subsequent etching than non-laser-irradiated areas. For glass substrates, laser pulses are suitable that have a wavelength at which the glass substrate has a high transmission, for instance a wavelength of 1064 nm, e.g. with pulse lengths of at most 100 ps or of at most 50 ps, preferably at most 10 ps. The laser source is operated in pulsed mode, the laser beam is moved over the glass substrate in sections or resp. with interruptions. The spacing of the pulses irradiated onto the glass substrate is set by the pulse frequency and the speed of movement of the laser beam over the glass substrate.

Recesses traversing through glass substrates, of which recesses e.g. at least a fraction is inclined toward one another or resp. is not in parallel to one another and/or which are inclined to the perpendicular, which recesses extend between the surfaces of a glass substrate lying opposite and in parallel, can be generated by treating the glass substrate with laser pulses at an angle of less than 90° to the surface, and subsequent etching. Recesses traversing through the glass substrate, which recesses are inclined relative to one another and are not in parallel, are suitable for producing a glass-plastic composite in which one each of two different plastics is applied onto one of the opposite surfaces of the glass substrate and extends into the recesses. Therein, the different plastics are each interlocked with a portion of the recesses of the glass substrate and are thereby form-fittingly connected by means of the glass substrate.

The etching can be carried out with hydrofluoric acid, e.g. 1 to 20 wt.-%, and/or sulfuric acid and/or hydrochloric acid and/or phosphoric acid, at e.g. 5 to 40° C. The creation of recesses, which preferably traverse through the glass substrate, by irradiating the glass substrate with laser pulses with subsequent etching has the advantage that the glass substrate does not have any cracks or stresses generated by these process steps.

The glass substrate can be flat and, especially prior to irradiation with laser pulses and prior to etching, can e.g. have a thickness of up to 800 μm, preferably 100 to 800 μm, e.g. 300 to 500 μm, after the etching e.g. a thickness that is smaller by 50 to 700 or by up to 200 μm and traversing recesses in the laser-irradiated areas. In the production of recesses by laser pulses and subsequent etching, such traversing recesses can be substantially cylindrical, e.g. with a small angle, e.g. from 3° to 15° tapering conically from the surface of the glass substrate into the glass volume. The recesses can have an hourglass-shaped cross-section through the thickness of the glass substrate, wherein the diameter decreases along the thickness of the glass substrate toward the center, e.g. in a funnel shape, and widens in a funnel shape from the center to the opposite surface. Thereby, an area of smallest cross-section of the recess is formed within the thickness of the glass substrate. This area of smallest cross-section forms a preferred undercut. Therein, the slope of the funnel shape can each be approximately linear.

The recesses can e.g. have, measured in the plane of a surface of the glass substrate, a cross-section in the range from 10 μm up to 1 mm, e.g. from 20 or from 50 μm up to 800 μm or up to 700 μm, up to 600 μm, up to 500 μm, up to 400 μm or 300 μm or up to 200 μm or up to 100 μm, in each case +50 μm and/or −50 μm. Generally preferably, glass substrates with recesses have a plurality of recesses, e.g. at least 10, at least 20, at least 100 or at least 200 recesses, e.g. over a distance of at least 1 cm or at least 2 cm, e.g. over 2 to 20 cm or up to 10 cm. Generally, recesses can be arranged at a spacing of 0.2 to 2 mm, e.g. over a distance of at least 1 cm or at least 2 cm, e.g. over 2 to 20 cm or up to 10 cm.

The recesses have at least one undercut. Optionally, an additional undercut can be a recess traversing through the glass substrate, so that the one surface forms an additional undercut for plastic which is applied onto the glass substrate from the opposite surface.

An undercut is formed by the recess widening within the glass substrate, especially widening in the direction of the surface of the glass substrate lying opposite to the surface onto which the solidifying plastic is applied. Alternatively or additionally, an undercut can be formed by the recess tapering and adjacently widening, e.g. in each case conically. Conically tapering recesses that extend from the surface into a glass substrate are formed by etching a glass substrate along the positions irradiated by laser pulses, because the etching reaction progresses from the glass surface into the glass volume along the positions irradiated and therefore close to the glass surface has a longer exposure time. Since the etching reaction acts on all, resp. both, opposing surfaces of the glass substrate, this results in a cross-section tapering from the surface of the glass substrate, e.g. to a smallest cross-section that lies between the surfaces of the glass substrate, and widens in the direction of the opposing surface.

The recesses are arranged e.g. at a spacing from one another which amounts to at least 10%, at least 20% or at least 50% or at least 200% of the diameter of the recess, measured in the plane of a surface of the glass substrate. The distance can e.g. amount up to the 20-fold or up to the 15-fold or up to the 10-fold, e.g. up to 200% or up to 100% or up to 50% of the diameter of the recess, measured in the plane of a surface of the glass substrate.

The solidifying plastic can e.g. be a thermoplastic which is heated to a temperature above its glass transition temperature or above its melting temperature. The heating can be done e.g. by laser radiation of the plastic and/or by application of ultrasound, e.g. by ultrasonic welding, e.g. optionally simultaneously with or prior to pressing the plastic against the glass substrate. Alternatively, a thermoplastic resin can be applied in the liquid state by injection moulding, by 3D printing or by other printing processes. Alternatively, the plastic can be a thermoset which is applied prior to or during its curing. Optionally, the curing of a thermoset can be initiated by irradiation, e.g. with UV radiation, which is optionally laser radiation.

Therein, the solidifying plastic in step 2 is applied with pressure that pushes the plastic into the recesses, and/or the plastic is drawn into the recesses by capillary forces. Optionally, additionally, ultrasonic vibrations can be applied to the glass substrate and/or to the solidifying plastic.

It has shown that thermoplastics or curable mixtures which react to thermosets can have a sufficiently low viscosity in order to be drawn by capillary forces into recesses which preferably traverse through the glass substrate, e.g. into recesses having a diameter of 5 to 100 μm, e.g. 10 to 20 μm. The pressure can be positive pressure by which the solidifying plastic is pressed against the glass substrate, or can be negative pressure which draws the plastic into the recesses through traversing recesses from the glass substrate surface that lies opposite to the plastic. Preferably, the plastic is introduced into the recesses until the plastic encompasses at least one undercut of the recesses.

The solidification of the plastic can occur e.g. by rigidifying, in particular by cooling if the plastic is a thermoplastic, or by reactive curing if the plastic is a thermoset.

It has shown that the glass-plastic composite is a form-fitting composite in which the plastic is arranged on the surface and in the recesses of the glass substrate. The surfaces of plastic and glass substrate that lie on top of one another even in small dimensions have sufficient surface area to be fluid-proof. The recesses traversing through the glass substrate have the advantage that the undercuts formed within the recesses form a form-fitting and fluid-proof connection with the plastic that is introduced therein. Therein generally, the plastic can have a different expansion behaviour upon temperature changes than the glass substrate. At expansion of the plastic to a lesser extent than that of the glass substrate, the plastic preferably is drawn more strongly into the e.g. cone-shaped recess, at expansion of the plastic to a greater extent than that of the glass substrate, the plastic preferably presses more strongly perpendicularly against the wall of the e.g. cone-shaped recess.

Optionally, the glass substrate in an area outside of the glass-plastic composite can have a closed surface or can be fluid-proof. Further optionally, the glass substrate in an area outside of the glass-plastic composite can have recesses which are preferably traversing and e.g. form channels for the passage of liquids and/or gases. Recesses of the glass substrate in the area outside of the glass-plastic composite are preferably circumferentially enclosed by the glass-plastic composite, wherein the plastic e.g. forms a conduit, the one end of which is covered by a glass substrate, or the plastic forms a wall e.g. of a container, in which wall an opening is covered by the glass substrate. Therein, the area outside of the glass-plastic composite can be the area which is enclosed by the plastic or resp. by the glass-plastic composite and which covers the clear inner cross-section. Generally, such recesses of the glass substrate, in particular traversing recesses in the area outside of the glass-plastic composite, can have a coating on their surface, preferably a coating exclusively on the surface of the recess, so that the surfaces of the glass substrate outside of the recesses have no coating or have another coating which is e.g. inert.

A coating can e.g. be an organic coating with organic residues, e.g. C1 to C12 aliphatic groups, optionally containing an amino group, carboxylic acid group, which organic residues are e.g. generated by reaction with an organic silane compound (e.g. APTES). Additional reactive substances can be bound to the coating of the recesses, e.g. protein, especially antibodies, or nucleic acids, which react with analytes from a sample.

The invention also relates to a process, especially for analysis, in which a glass substrate, which is fixed in a glass-plastic composite, is contacted with a fluid, wherein the glass substrate in the area outside of the glass-plastic composite has recesses which are preferably recesses traversing through the glass substrate. Therein, the glass substrate can form a sieve for a fluid and can be used in a process for size separation of a fluid. Preferably, in the analytical process, an interaction of an analyte with a coating is detected, which analyte can be contained in the fluid, and which coating is disposed within the traversing recesses that are arranged outside of the glass-plastic composite. Detection can e.g. be done by measuring the light absorption or light emission upon irradiation with light.

In one embodiment, glass frit is introduced into at least one recess of the glass substrate, preferably into all recesses of the glass substrate. The glass frit preferably has a lower softening temperature or melting temperature than the glass substrate, and the glass substrate with the glass frit introduced into the at least one recess or into all recesses is heated, e.g. to a temperature which is above the softening temperature or melting temperature of the glass frit and below the softening temperature or melting temperature of the glass substrate.

Therein, glass frit can be introduced only into those recesses that are covered by the plastic in the glass-plastic composite, and/or only into those recesses that are located in the area outside of the glass-plastic composite.

The glass frit can be a composition of glass frits of different glass types, which have different melting temperatures. The melting temperature of at least one glass type, preferably of all glass types of the glass frit, are below the softening temperature, preferably below the melting temperature of the glass substrate. The glass frit, which is preferably present in the form of a paste, can be introduced into the recesses of the glass substrate by printing processes. The glass frit or resp. glass frit paste is preferably subsequently melted at least partially by heating the glass substrate to a temperature that lies above the melting temperature of at least one glass type or of all glass types of the glass frit, and that lies below the softening temperature, preferably below the melting temperature of the glass substrate. After cooling, the glass frit can form a porous glass structure, e.g. a porous layer, within the recess, which glass structure preferably adheres to the recess and especially is form-fittingly connected to an undercut of the recess.

A porous glass structure or resp. porous layer, which is formed from glass frit in the recess, has a plurality of undercuts, can strengthen the bond with the plastic and preferably forms a force-fitting and/or form-fitting glass-plastic composite.

In one embodiment, the glass-plastic composite is formed between at least two glass substrates, each of which having recesses. (see FIG. 3) Therein, the glass substrates are preferably arranged in such a way that in their recesses they each have an undercut which is encompassed by the plastic, e.g. the glass substrates can each have cone-shaped traversing recesses, and the glass substrates can be arranged in such a way that the smaller diameters of those recesses face the smaller diameters of the recesses of the other glass substrate, or resp. that the recesses with their larger diameters face away from the other glass substrate. Therein, the at least two glass substrates can have different coefficients of thermal expansion, e.g. for use as temperature sensors. Therein, at least two glass substrates can be arranged with their recesses matching one another and plastic can be arranged between these glass substrates and the plastic can be introduced into the recesses which are arranged matching one another. Therein, the at least two glass substrates can be arranged directly adjacent to one another when the plastic is introduced into the recesses which are arranged matching one another. Alternatively, the at least two glass substrates can be arranged at a distance from one another, wherein the plastic is arranged on one or both of the glass substrates and the glass substrates can be moved against one another such that thereby the plastic is introduced into the matchingly arranged recesses.

Optionally, the glass-plastic composite of a glass substrate and plastic and/or the glass-plastic composite between two glass substrates can form a glass insert moulding, e.g. for use as a display surface and/or as a touch-sensitive display surface for electronic devices.

Optionally, the plastic can be electrically conductive, e.g. electrically conductive silicone, e.g. for use of the glass-plastic composite as a sensor surface.

Generally, instead of glass, another material which is at least partially transparent to a laser pulse and which especially is an inorganic material can be used in the invention. A material that can be used instead of glass is e.g. silicon or sapphire. Accordingly, instead of a glass substrate e.g. a silicon substrate or a sapphire substrate having the recesses can form a plastic composite. In substrates made of silicon, recesses can be created by coating with etch resist, photolithographically generating holes in the etch resist, etching, and subsequently removing the etch resist.

Figure 14:
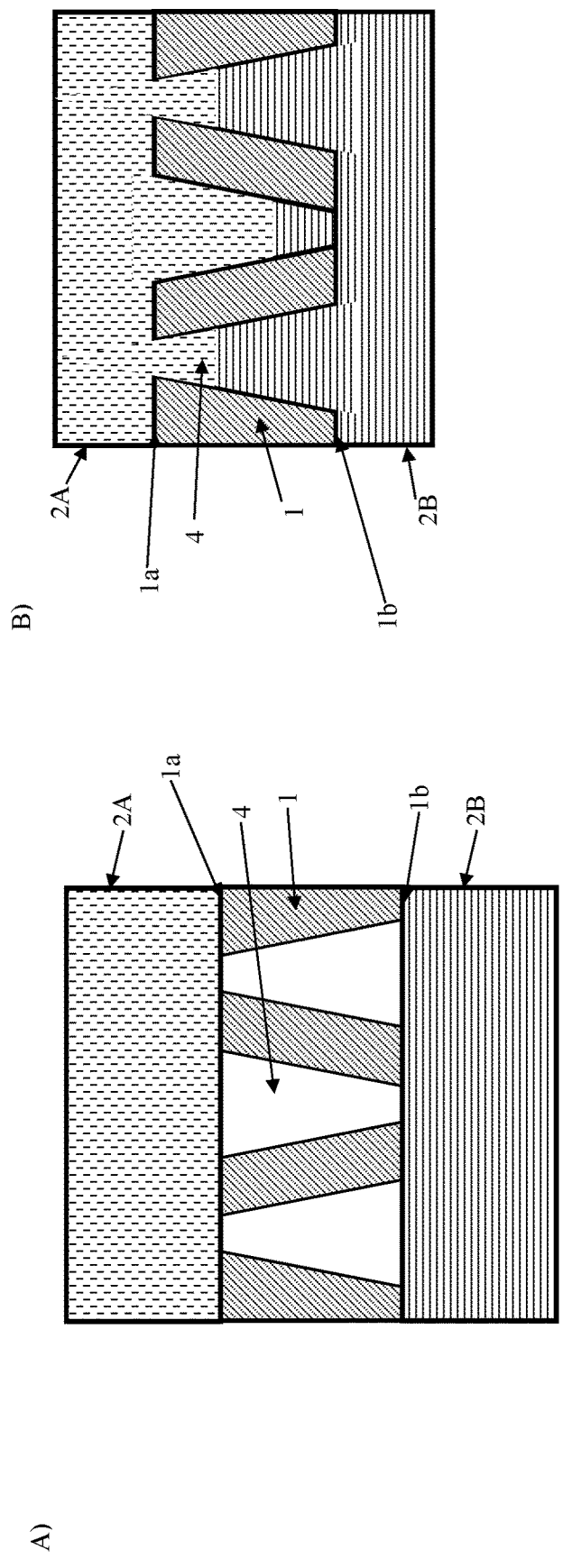

In a further embodiment, the glass-plastic composite is formed between two different plastics which are deposited onto the glass substrate onto opposite surfaces and are respectively introduced into recesses of the glass substrate. The different plastics are preferably those that cannot be joined by e.g. welding or glueing. Generally, especially in this embodiment, the recesses can be formed as traversing the glass substrate and can each have undercuts and/or can run inclined to one another, preferably at least partially inclined to one another and not in parallel, through the glass substrate. This is schematically shown in FIG. 14. Therein, the recesses are inclined to one another when their longitudinal axes, which extend through the glass substrate, are inclined to one another.

Therein, the embodiment in which the glass-plastic composite is formed between two different plastics can be combined with the embodiment in which the glass-plastic composite is formed between at least two glass substrates. Therein, both onto at least one glass substrate different plastics are respectively applied onto its opposite surfaces and are introduced into its recesses, and also at least one further glass substrate is connected to one of the plastics by a glass-plastic composite. Preferably, the glass substrates are arranged in parallel to one another.

Optionally, in order to form a plastic edge which can be arranged circumferentially around the glass substrate, plastic can be arranged only along a glass substrate edge provided with recesses. Such a plastic edge can encompass a surface of the glass substrate, which surface connects two opposing surfaces of the glass substrate, and can extend to one surface or to both opposing surfaces of the glass substrate. Therein, an area of one or both of the opposite surfaces of the glass substrate, which area is adjacent to the area of the glass substrate encompassed by plastic, can have a greater thickness than the area encompassed by plastic or resp. by a plastic edge. To this end, in the process, the area that is to have a greater thickness can be coated with a coating which is resistant to the etching bath, also referred to as a resist, so that during etching, only the area of the glass substrate outside of the resist becomes thinner and only laser-irradiated positions within it are etched into recesses.

The glass-plastic composite can e.g. form an edge protector at the edge of glasses, form a seal, form a part of a microfluidic channel, or form a circuit board, especially an interposer, e.g. as a carrier for a circuit. Accordingly, glass substrates having a glass-plastic composite formed along their edge area can be used as a microfluidic channel, as a circuit board, especially as an interposer.

Generally, the invention relates to a process for the production of glass substrates having recesses traversing through the thickness of the glass substrate and having an undercut within the recess, e.g. a cone-shaped or V-shaped cross-section. The recesses can be cone-shaped or resp. rotationally symmetrical, or line-shaped. Therein, the recesses can be arranged such that one portion of the recesses tapers from a first surface of the glass substrate to its opposite second surface, and another portion of the recesses tapers from the second surface of the glass substrate to its first surface. In this embodiment, the process produces glass substrates having undercuts located in the recesses, one part of which undercuts are arranged closer to a first surface of the glass substrate and the other part of which undercuts are arranged closer to the second surface, which lies opposite thereto, of the glass substrate. The areas of the glass substrate which are left behind during etching and which are arranged between recesses, the cross-sections of which taper in opposite directions from the first surface to the opposite second surface of the glass substrate, can, in sections or in the case of line-shaped recesses, have a parallelogram-shaped cross-section from the first surface to the opposite second surface of the glass substrate and can be inclined against the surfaces of the glass substrate, e.g. less than 90° or less than 85°, less than 80° or less than 75 or than 70°. This embodiment is particularly suitable for joining two different plastics, which are applied onto the opposite surfaces of the glass substrate and from the opposite surfaces are introduced into the recesses. Such a glass-plastic composite locks the different plastics together by means of the glass substrate lying in-between, so that these plastics optionally cannot form a material bond with one another and/or with the glass substrate.

The figures show in

Figure 2:
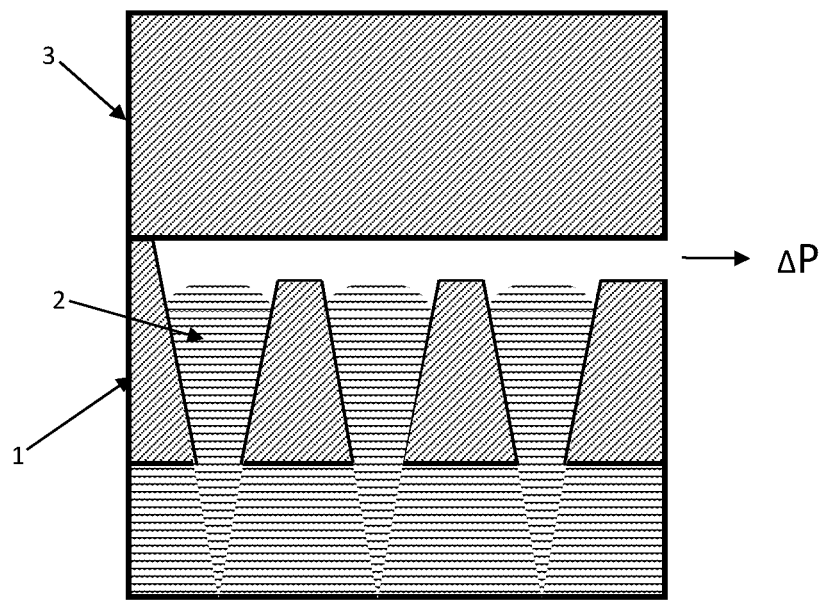
Figure 3:
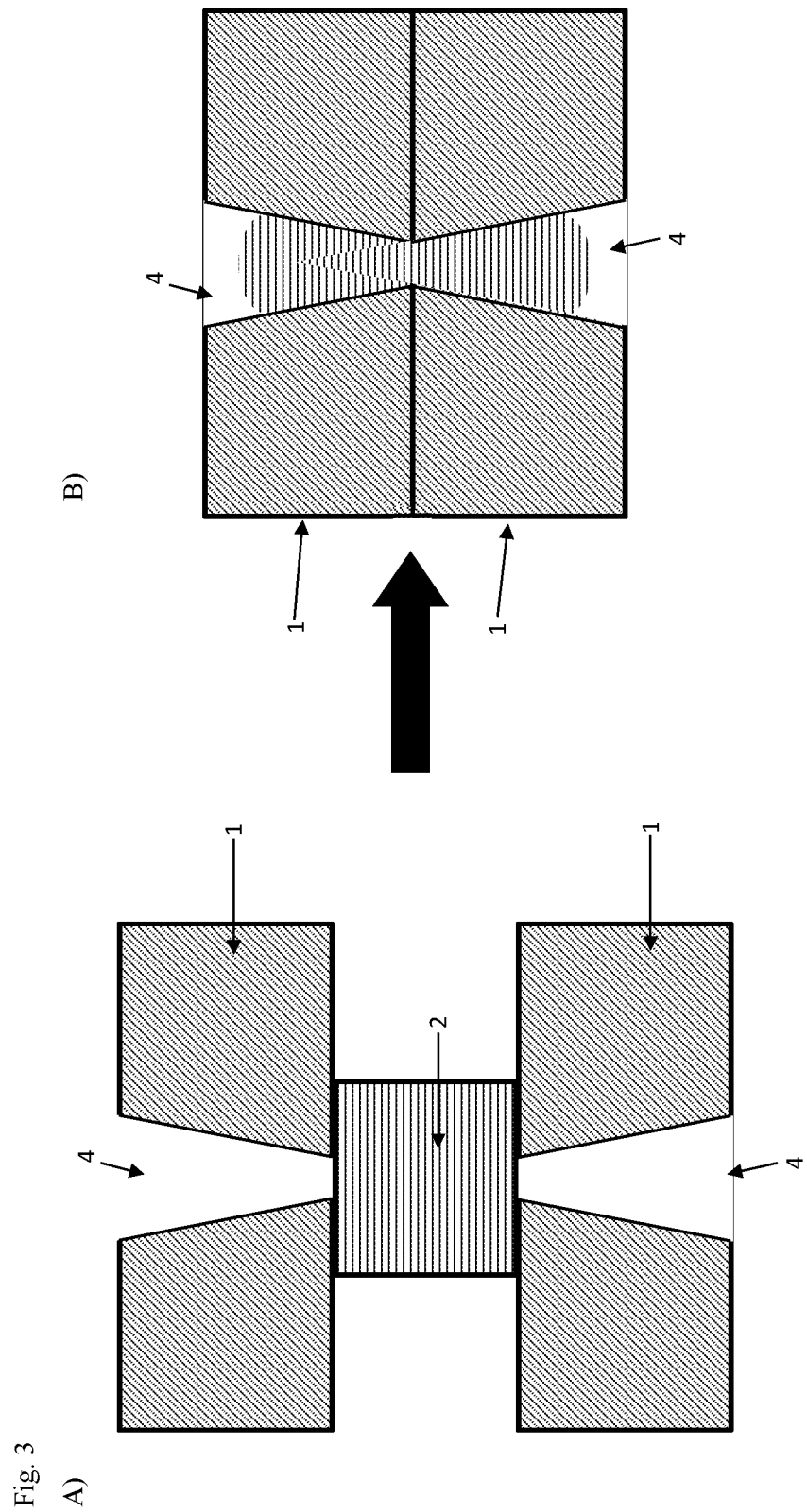
Figure 5:
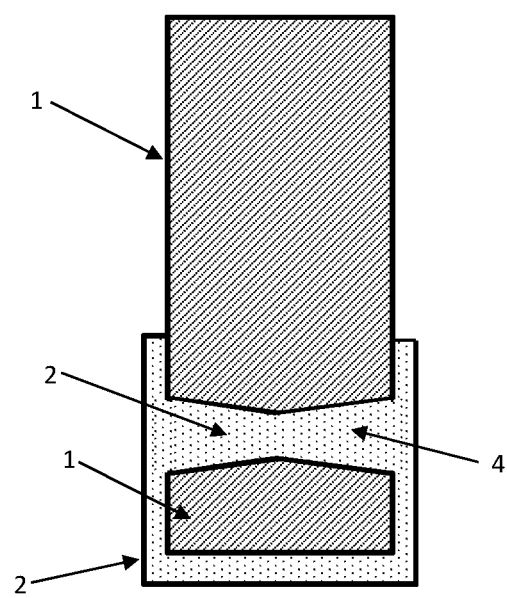
Figure 6:
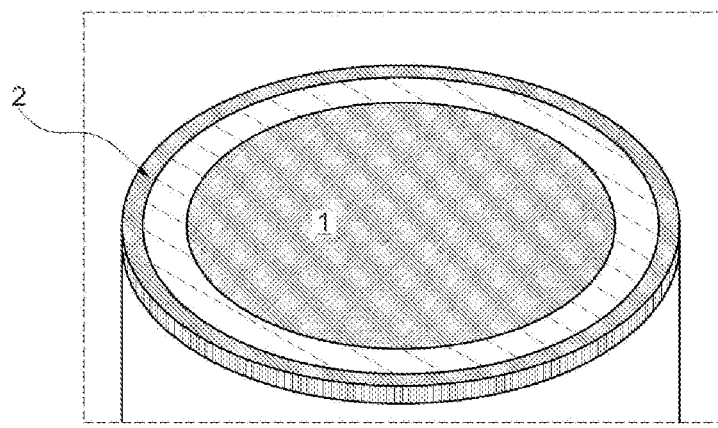
Figure 8:
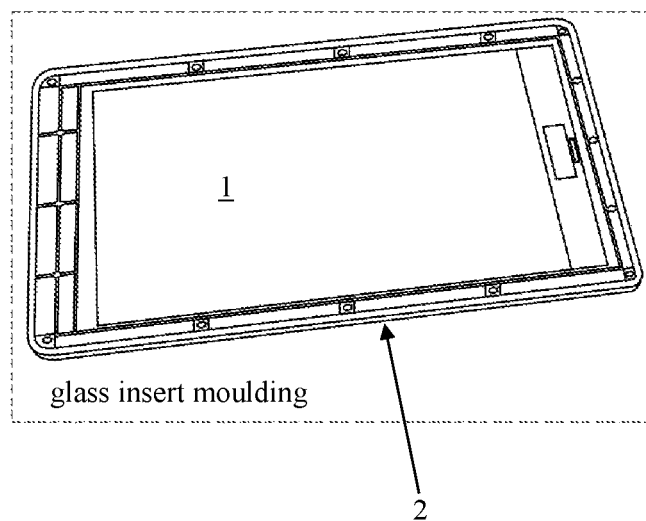
Figure 13:
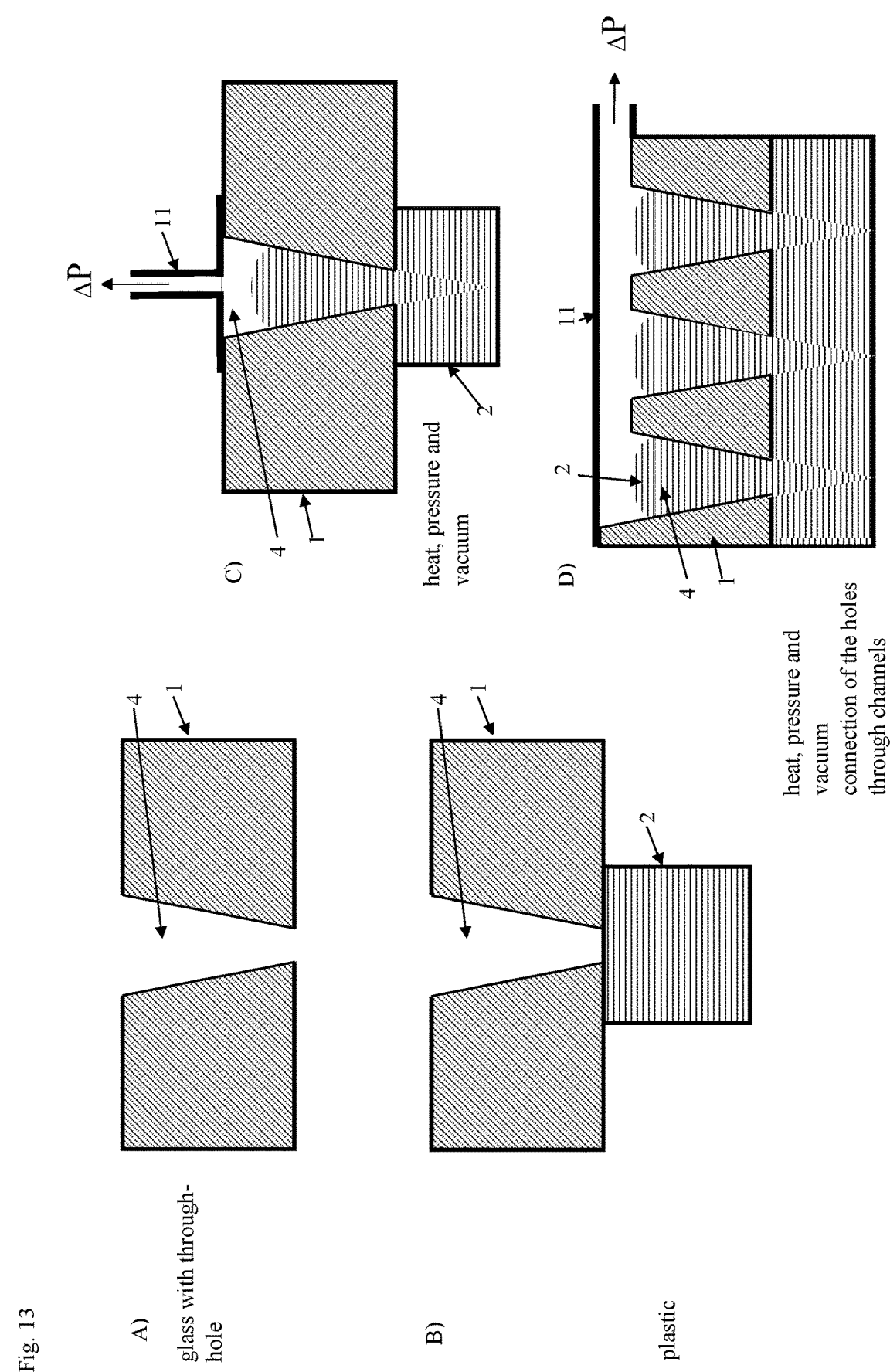

FIG. 1 a glass-plastic composite according to the invention,

FIG. 2 a process for producing a glass-plastic composite according to the invention, FIGS. 3 A) and B) a process for producing a glass-plastic composite according to the invention, FIG. 4 A) to C) a process for producing a glass-plastic composite according to the invention, FIG. 5 a glass-plastic composite according to the invention, FIG. 6 a glass-plastic composite according to the invention, FIGS. 7 A) and B) a section through a glass-plastic composite according to the invention, FIG. 8) a glass-plastic composite according to the invention, FIG. 9 A) to C) a process for producing a glass-plastic composite according to the invention, in which the recess tapers from both opposite surfaces of the glass substrate to an undercut at a distance from both surfaces of the glass substrate, FIG. 10 A) to C) a process for producing a glass-plastic composite according to the invention, in which the recess tapers from one surface of the glass substrate to the opposite surface and forms an undercut therein, FIG. 11 A) to C) an embodiment of the process, FIG. 12 A) to C) a further embodiment of the process, FIG. 13 A) to D) a further embodiment of the process, FIGS. 14 A) and B) an embodiment of the process, and FIG. 15 A) to E) preferred processes for the production of recesses in glass substrates.

Generally, the glass-plastic composite obtainable by the process is also described by the process.

FIG. 1 shows a schematic cross-section through a glass substrate 1, into the cone-shaped traversing recesses of which a plastic 2 is introduced and produces a form-fitting connection.

Generally, the plastic 2 can optionally be introduced into traversing recesses in the glass substrate 1 by applying negative pressure, for example by covering the glass substrate 1 on the surface opposite to the surface onto which plastic 2 is applied, by means of a cover plate 3, and applying negative pressure ΔP, as shown schematically in FIG. 2.

FIG. 3A) schematically shows the connection of two glass substrates 1, each of which has recesses with undercuts in that the recesses widen conically, wherein the smaller cross-sections of the recesses 4 face one another and the larger cross-sections of the recesses 4, which are traversing, are arranged on the surfaces of the glass substrates 1 facing away from one another. By applying heat and pressure, or resp. by curing a thermosetting plastic, a form-fitting connection between the two glass substrates 1 is produced by the plastic 2 (FIG. 3B).

FIG. 4 schematically shows the production of a glass-plastic composite covering only one surface of a glass substrate 1. Therein, a glass substrate 1 (FIG. 4A) is brought into contact with the curable plastic on one surface, for example by immersing the glass substrate 1 in a liquid composition of the plastic, for example plastic dissolved in solvent (e.g. ABS in acetone), or in a curable starting mixture for a thermoset (FIG. 4B).

As shown in FIG. 4C, the plastic 2 forms a coating bonded to the glass substrate 1 by form-fitting, which coating extends into and through the conically widening recess.

FIG. 5 schematically shows a cross-section through a plastic edge that is made of plastic 2 attached to a glass substrate 1 having recesses with an undercut which is formed in that the recess is arranged to traverse through the thickness of the glass substrate 1 and, due to the preferred production process by irradiating with a laser pulse with subsequent etching, by the recess tapering conically from both surfaces to an area of smallest cross-section within the glass substrate 1.

FIG. 6 schematically shows a glass substrate 1 which has traversing recesses and which is connected to plastic 2 that forms a wall and has an opening which is covered by the glass substrate 1. Therein, the glass substrate 1 in an edge region is connected to plastic 2 by the glass-plastic composite and also has traversing recesses in the area outside the plastic 2, which area is enclosed by the plastic 2.

FIG. 7A shows a section through a glass substrate 1 in which through-holes 4 were created by the preferred process by laser pulses and subsequent etching, which through-holes 4 taper conically towards one another from both surfaces of the glass substrate 1 and form a position having the smallest cross-section as an undercut. This glass substrate 1 was moved with low pressure against a liquefied thermoplastic 2 which extended through the traversing recesses of the glass substrate 1, exited on the opposite surface of the glass substrate 1 and creates a form-fitting connection. FIG. 7B shows a section through two interconnected glass substrates 1, the recesses 4 of which have an area of smallest cross-section as an undercut within the recesses 4.

FIG. 8 shows a glass insert moulding according to the invention. Therein, the glass substrate 1 has recesses traversing through the glass substrate 1 in its circumferential area, and has an undercut which is formed in the recess within the glass substrate 1. The plastic 2 encompasses the glass substrate 1 along its circumferential area.

FIGS. 9 and 10 schematically show a glass substrate 1 with a recess 4 (in FIG. 9 a through-hole 4 having the smallest inner cross-section in the center of the glass substrate 1, in FIG. 10 a through-hole 4 whose funnel shape forms an undercut), into which recess 4 a plastic 2, which is applied onto the glass substrate 1, is pressed into it by means of heat and pressure F. Therein, a plastic 2 is applied onto the glass substrate 1 (FIG. 9A, FIG. 10A) onto one of its surfaces (FIG. 9B, FIG. 10B) and is introduced into the recess 4 by heat and pressure directed against the glass substrate 1 (FIG. 9C, FIG. 10C). The plastic 2 fills the recesses 4 each until behind the undercut which is formed within the recess 4.

FIGS. 11 to 14 schematically show embodiments of the invention. Onto a surface of the glass substrate 1 shown in FIG. 11A) or FIG. 12A), in which a traversing recess 4 is formed, a plastic 2 is applied (FIG. 11B, FIG. 12B) and (FIG. 11C) is introduced into the recess 4 by means of ultrasound and by pressure directed onto the plastic against the glass substrate 1, or (FIG. 12C) is introduced into the recess 4 by heating by means of radiation 10 and by pressure F directed against the glass substrate 1 in the direction of the plastic 2. Therein, FIG. 12C) schematically shows that the plastic 2 can be introduced into the recess 4 by a combination of pressure F and heating by radiation 10, e.g. laser radiation, the cone shape of which recess 4 forms the undercut within the recess 4.

FIG. 13 A) shows a glass substrate 1 with a traversing recess 4 having a cone-shaped cross-section. A plastic 2 is arranged against a surface of the glass substrate 1 (FIG. 13B) and is introduced into the recess 4 by means of heat, pressure directed onto the plastic against the glass substrate and additionally by negative pressure ΔP, which is applied to the surface of the glass substrate 1 which lies opposite to the plastic 2 (FIG. 13C). This negative pressure ΔP can be applied by a suction bell 11 which lies against the glass substrate 4 and which covers individual recesses (FIG. 13C), or by a suction bell 11 which covers at least two, preferably all, recesses 4 into which plastic 2 is introduced. Therein, the suction bell 11 can rest on areas of the glass substrate 1 that protrude beyond the areas between which the recesses 4 are arranged, into which recesses 4 plastic 2 is introduced, as schematically shown in FIG. 13 D).

FIG. 14 shows the connection of two different plastics 2A, 2B, between which a glass substrate 1 having a plurality of traversing recesses 4 is arranged, wherein a portion of the recesses 4 tapers from a first surface 1a of the glass substrate 1 to its opposite second surface 1b, and another portion tapers from the second surface 1b of the glass substrate to its first surface 1a.

Therein, the traversing and recesses 4, which are inclined against one another, can be cone-shaped or can be long recesses which are inclined towards one another and have a V-shaped cross-section.

FIG. 15 A) in sectional view shows a process for generating recesses 4 in a glass substrate 1 by irradiating an original glass substrate 1a with laser radiation L at the positions where recesses 4 are to be generated. The laser beam L, which is generally preferably a sequence of laser pulses, penetrates the glass substrate 1a up to a depth dependent on the focal position and generates a modification M therein. FIG. 15 B) in sectional view illustrates that the subsequent etching of the glass substrate 1a generates the recesses 4 in the glass substrate 1. Therein, the laser beam L can be irradiated onto the glass substrate 1 in the form of a point or a line. For generating recesses 4, a portion of which tapers from a first surface of the glass substrate 1 to its opposite second surface and another portion tapers from the second surface of the glass substrate to its first surface, an original glass substrate 1 can be irradiated on the first and on the second surface each with laser radiation L which penetrates the glass substrate only for a portion of the thickness, e.g. up to 70 or up to 80 or up to 90% of the thickness of the glass substrate, so that during the subsequent etching, the larger cross-section of the recesses is generated in the surface onto which the laser radiation was irradiated, and the smaller cross-section of the recesses is generated in the opposite surface of the glass substrate 1, which opposite surface was not irradiated through by the laser radiation. Especially by irradiating the laser beam L up to a small distance in front of or as far as through the opposite surface of the glass substrate 2, a traversing recess is generated during the subsequent etching. Therein, the laser radiation can be irradiated in form of a point in order to generate cone-shaped recesses.

FIGS. 15 C) to E) illustrate an alternative process for generating recesses 4, in which process an original glass substrate 1a is penetrated by laser radiation L through the cross-section of the glass substrate 1a and generates a modification M extending through the cross-section of the glass substrate 1. A surface of the glass substrate 1 is coated with etch resist R, e.g. lacquer or plastic film. During the subsequent etching, the glass substrate 1 is not attacked on the surface coated by etch resist R, so that the generated recess 4 extends into the glass substrate 1 from the surface that lies opposite to the etch resist R. Subsequently, the etch resist R is preferably removed.

The invention claimed is:

1. A process for the production of a glass-plastic composite comprising or consisting of the steps of
providing a glass substrate having spaced-apart recesses traversing through the glass substrate and having at least one undercut which is formed by the recesses widening within the glass substrate,
applying a plastic onto the glass substrate into a plurality of the recesses and introducing the plastic into the plurality of the recesses, wherein the plastic comprises a thermoplastic,
pressing the plastic against the glass substrate, applying negative pressure to a surface of the glass substrate which lies opposite to the one to which the plastic is applied, and/or applying ultrasound to the plastic, heating the thermoplastic to a temperature above its glass transition temperature or above its melting temperature simultaneously with or prior to the pressing, applying negative pressure and/or applying ultrasound, wherein no additional material is introduced into the composite and wherein the applying, pressing and heating further comprises applying the plastic on the surface of the glass substrate to create a form-fitting glass-plastic connection, and solidifying the plastic.

2. The process according to claim 1, wherein the recesses within the glass substrate taper and adjacently widen.

3. The process according to claim 1, wherein the recesses within the glass substrate widen in the direction towards the surface of the glass substrate which lies opposite to the surface onto which the plastic is applied.

4. The process according to claim 1, comprising a preliminary step of treating the substrate with a laser and then etching the glass substrate to form the recesses.

5. The process according to claim 1, wherein the recesses are arranged at a spacing from one another which amounts to at least 10% up to the 20-fold of the diameter of the recess, measured in a plane of the surface of the glass substrate.

6. The process according to claim 1, wherein the applying comprises leaving an area of recesses empty of the plastic to form through-holes in that area and enclosing the area with the plastic.

7. The process according to claim 6, comprising a preliminary step of forming the recesses by irradiation with laser radiation and subsequent etching through the glass substrate.

8. The process according to claim 1, wherein the heating comprises heating by laser radiation of the plastic and/or by application of ultrasound.

9. The process according to claim 1, wherein the glass substrate comprises a closed surface or is fluid-proof in an area outside of the plurality of recesses.

10. A process for the production of a glass-plastic composite comprising or consisting of the steps of providing a glass substrate having spaced-apart recesses traversing through the glass substrate and having at least one undercut which is formed by the recesses widening within the glass substrate, applying a plastic onto the glass substrate into a plurality of the recesses and introducing the plastic into the plurality of the recesses, wherein the plastic comprises a thermoplastic, pressing the plastic against the glass substrate, applying negative pressure to a surface of the glass substrate which lies opposite to the one to which the plastic is applied, and/or applying ultrasound to the plastic, heating the thermoplastic to a temperature above its glass transition temperature or above its melting temperature simultaneously with or prior to the pressing, applying negative pressure and/or applying ultrasound, and solidifying the plastic, wherein the recesses are inclined toward one another, and wherein the applying comprises applying the plastic and an additional different plastic onto opposite surfaces of the glass substrate and into the recesses.

11. The process according to claim 10, prior to applying the plastic, introducing glass frit comprising a lower softening temperature or melting temperature than the glass substrate into at least one recess of the plurality of recesses, and the glass substrate with the glass frit introduced into the at least one recess is heated to a temperature above the softening temperature or the melting temperature of the glass frit below a softening temperature or melting temperature of the glass substrate.

12. A process for the production of a glass-plastic composite comprising or consisting of the steps of providing a glass substrate having spaced-apart recesses traversing through the glass substrate and having at least one undercut which is formed by the recesses widening within the glass substrate, applying a plastic onto the glass substrate into a plurality of the recesses and introducing the plastic into the plurality of the recesses, wherein the plastic comprises a thermoplastic, pressing the plastic against the glass substrate, applying negative pressure to a surface of the glass substrate which lies opposite to the one to which the plastic is applied, and/or applying ultrasound to the plastic, heating the thermoplastic to a temperature above its glass transition temperature or above its melting temperature simultaneously with or prior to the pressing, applying negative pressure and/or applying ultrasound, and solidifying the plastic, wherein the recesses are arranged such that one portion of the recesses tapers from a first surface of the glass substrate to its opposite second surface and another portion of the recesses tapers from the second surface of the glass substrate to its first surface, and wherein the applying comprises applying the plastic and an additional different plastic into different ones of the first surface and the opposite second surface.

13. A process for the production of a glass-plastic composite comprising or consisting of the steps of providing a glass substrate having spaced-apart recesses traversing through the glass substrate and having at least one undercut which is formed by the recesses widening within the glass substrate, applying a plastic onto the glass substrate into a plurality of the recesses and introducing the plastic into the plurality of the recesses, wherein the plastic comprises a thermoplastic, pressing the plastic against the glass substrate, applying negative pressure to a surface of the glass substrate which lies opposite to the one to which the plastic is applied, and/or applying ultrasound to the plastic, heating the thermoplastic to a temperature above its glass transition temperature or above its melting temperature simultaneously with or prior to the pressing, applying negative pressure and/or applying ultrasound, and solidifying the plastic, wherein the glass substrate comprises two glass substrates arranged with their recesses matching one another and the applying comprises applying the plastic between the two glass substrates.

14. The process according to claim 13, comprising arranging the two glass substrates directly adjacent to one another with the plurality of recesses being aligned during the applying the plastic.

15. The process according to claim 13, comprising arranging the two glass substrates at a distance from one another with the plurality of recesses being aligned and moving the two substrates against one another during the applying the plastic.

16. A process for the production of a glass-plastic composite comprising or consisting of the steps of providing a glass substrate having spaced-apart recesses traversing through the glass substrate and having at least one undercut which is formed by the recesses widening within the glass substrate, applying a plastic onto the glass substrate into a plurality of the recesses and introducing the plastic into the plurality of the recesses, wherein the plastic comprises a thermoplastic,
pressing the plastic against the glass substrate, applying negative pressure to a surface of the glass substrate which lies opposite to the one to which the plastic is applied, and/or applying ultrasound to the plastic,
heating the thermoplastic to a temperature above its glass transition temperature or above its melting temperature simultaneously with or prior to the pressing, applying negative pressure and/or applying ultrasound, and
solidifying the plastic, wherein the applying the plastic comprises forming a plastic edge circumferentially around the glass substrate.

* * * * *